(12) United States Patent
Williams

(10) Patent No.: US 9,992,884 B2
(45) Date of Patent: Jun. 5, 2018

(54) PHONE AND TABLET CASE

(71) Applicant: Armani Williams, Lubbock, TX (US)

(72) Inventor: Armani Williams, Lubbock, TX (US)

( * ) Notice: Subject to any disclaimer, the term of this patent is extended or adjusted under 35 U.S.C. 154(b) by 0 days. days.

(21) Appl. No.: 14/519,074

(22) Filed: Oct. 20, 2014

(65) Prior Publication Data

US 2015/0136620 A1    May 21, 2015

Related U.S. Application Data

(60) Provisional application No. 61/893,183, filed on Oct. 19, 2013.

(51) Int. Cl.

| H05K 5/02 | (2006.01) |
|---|---|
| A45C 11/00 | (2006.01) |
| A45C 11/18 | (2006.01) |
| A45C 15/06 | (2006.01) |
| H04B 1/3888 | (2015.01) |

(Continued)

(52) U.S. Cl.
CPC ............... *H05K 5/02* (2013.01); *A45C 11/00* (2013.01); *A45C 11/182* (2013.01); *A45C 15/06* (2013.01); *E05B 37/02* (2013.01); *E05B 39/005* (2013.01); *E05B 65/52* (2013.01); *E05B 73/0082* (2013.01); *G06F 1/1626* (2013.01); *G06F 1/1679* (2013.01); *G06F 21/86* (2013.01); *H04B 1/3888* (2013.01); *H04M 1/185* (2013.01); *A45C 2011/002* (2013.01); *A45C 2011/003* (2013.01);

(Continued)

(58) Field of Classification Search
CPC .. H05K 5/02; H05K 5/0221; A45C 2011/002; B65D 25/20

See application file for complete search history.

(56) References Cited

U.S. PATENT DOCUMENTS

| 8,418,852 B2 | 4/2013 | Ziemba | |
|---|---|---|---|
| 2007/0180873 A1* | 8/2007 | Yen | A45C 13/18 70/63 |

(Continued)

FOREIGN PATENT DOCUMENTS

| EP | 2408176 A1 | 1/2012 |
|---|---|---|
| JP | 2008500613 | 1/2008 |

(Continued)

OTHER PUBLICATIONS

International Search Report and Written Opinion, dated Jan. 28, 2015, PCT/US2014/061427, Williams, Armani, issued by the Korean Intellectual Property Office.

*Primary Examiner* — Anthony Stashick
*Assistant Examiner* — James Way
(74) *Attorney, Agent, or Firm* — Daniel J. Chalker; Chalker Flores, LLP

(57) ABSTRACT

A case for a portable electronic device includes a substantially hollow housing formed of a first section and a second section. The first section is dimensioned and configured to tightly retain the portable electronic device. A hinged connector secures a first portion of the first section to a first portion of the second section and allows access to the portable electronic device when the second section is in an open position. One or more locking mechanisms removably connect a second portion of the first section to a second portion of the second section and prevents access to the portable electronic device when the second section is in a closed and locked position. A locating device is disposed within or attached to the first section.

19 Claims, 11 Drawing Sheets

(51) Int. Cl.
  *E05B 73/00* (2006.01)
  *G06F 1/16* (2006.01)
  *G06F 21/86* (2013.01)
  *E05B 37/02* (2006.01)
  *E05B 39/00* (2006.01)
  *E05B 65/52* (2006.01)
  *H04M 1/18* (2006.01)

(52) U.S. Cl.
  CPC ............... *G06F 2200/1633* (2013.01); *G06F 2221/2111* (2013.01)

(56) References Cited

U.S. PATENT DOCUMENTS

| | | | | |
|---|---|---|---|---|
| 2009/0009415 | A1* | 1/2009 | Tanska | G06K 7/10336 343/742 |
| 2009/0146821 | A1* | 6/2009 | Kato | G06K 19/041 340/572.7 |
| 2010/0203927 | A1* | 8/2010 | Biddy, Jr. | H04M 19/04 455/567 |
| 2011/0174874 | A1* | 7/2011 | Poznansky | G06K 19/12 235/379 |
| 2011/0278288 | A1* | 11/2011 | Fuller | F41C 33/06 220/6 |
| 2012/0118772 | A1 | 5/2012 | Ellis-Brown | |
| 2012/0118773 | A1* | 5/2012 | Rayner | G06F 1/1626 206/320 |
| 2012/0209745 | A1* | 8/2012 | Spencer, II | G06Q 20/327 705/26.41 |
| 2012/0265682 | A1* | 10/2012 | Menon | G06Q 20/20 705/44 |
| 2012/0270600 | A1 | 10/2012 | Zelson | |
| 2012/0303520 | A1* | 11/2012 | Huang | H01M 10/46 705/39 |
| 2012/0305422 | A1 | 12/2012 | Vandiver | |
| 2013/0150004 | A1* | 6/2013 | Rosen | H04W 8/22 455/414.1 |
| 2013/0240380 | A1 | 9/2013 | Hansen | |
| 2014/0217862 | A1* | 8/2014 | Rayner | G06F 1/1601 312/223.1 |
| 2014/0265998 | A1* | 9/2014 | Nielson | H02J 7/0047 320/101 |
| 2014/0268516 | A1* | 9/2014 | Fathollahi | A45C 11/00 361/679.01 |
| 2015/0257503 | A1* | 9/2015 | Packer | B60R 25/24 701/2 |

FOREIGN PATENT DOCUMENTS

| | | |
|---|---|---|
| KR | 1020050105920 A | 11/2005 |
| KR | 1020110137033 A | 12/2011 |
| KR | 1020120086016 A | 8/2012 |
| KR | 1020120103854 A | 9/2012 |
| KR | 1020130033604 A | 4/2013 |
| KR | 200468042 Y1 | 7/2013 |
| KR | 200468119 Y1 | 7/2013 |

* cited by examiner

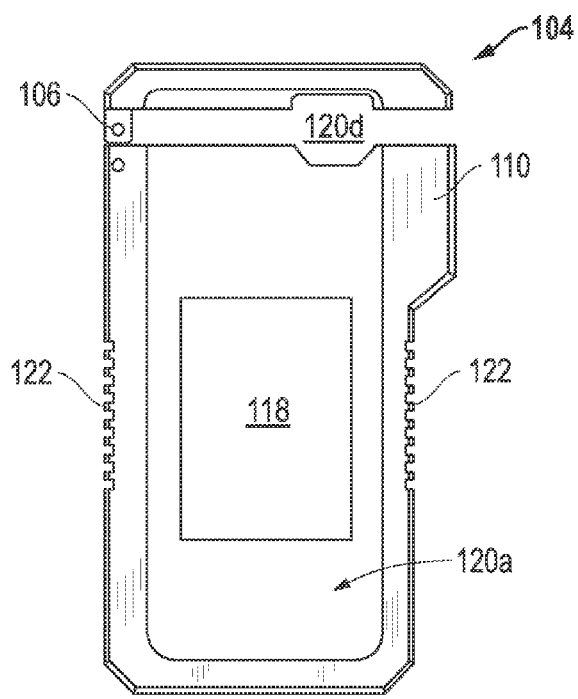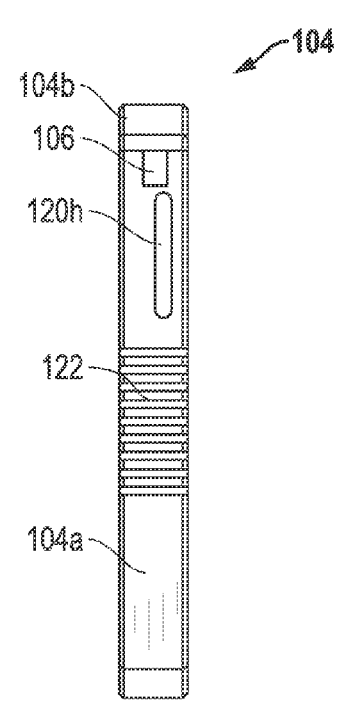
FIG. 4A    FIG. 4B
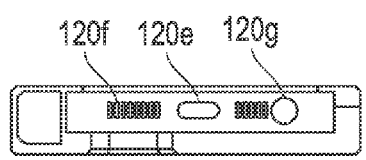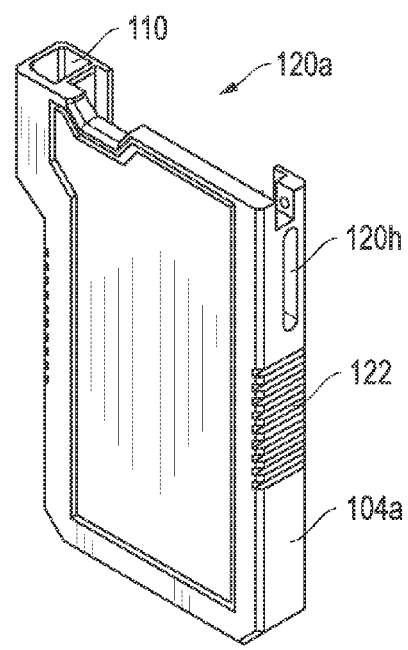
FIG. 4C    FIG. 4D

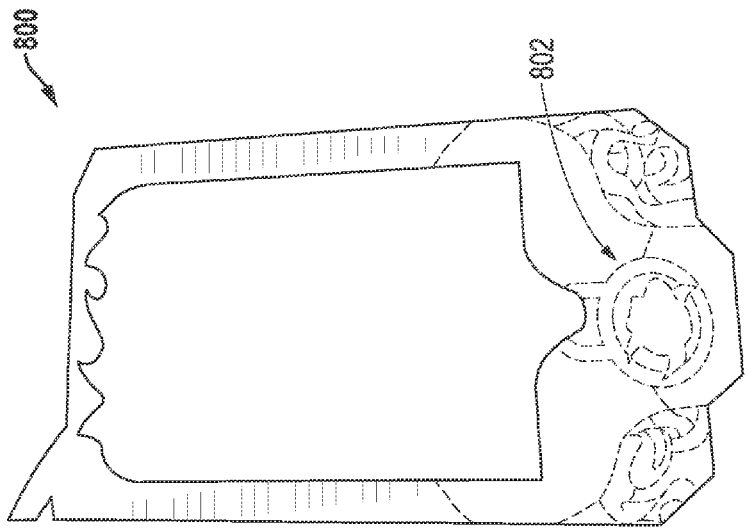
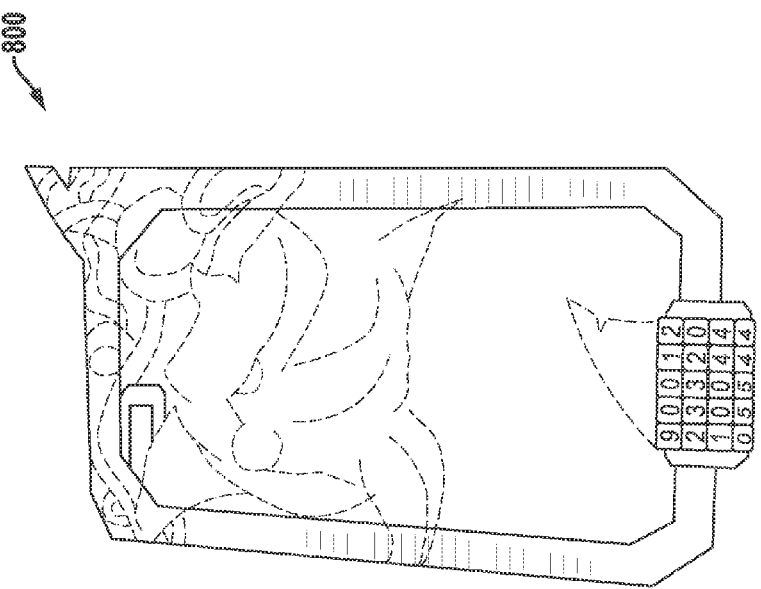

PHONE AND TABLET CASE

CROSS-REFERENCE TO RELATED APPLICATIONS

This application claims priority to and is a non-provisional of U.S. provisional patent application Ser. No. 61/893,183 filed on Oct. 19, 2013 and entitled "Phone and Tablet Case", which is hereby incorporated by reference in its entirety.

INCORPORATION-BY-REFERENCE OF MATERIALS FILED ON COMPACT DISC

None.

TECHNICAL FIELD OF THE INVENTION

The present invention relates in general to the field of portable electronics, and more specifically to a phone and tablet case.

STATEMENT OF FEDERALLY FUNDED RESEARCH

None.

BACKGROUND OF THE INVENTION

Without limiting the scope of the invention, its background is described in connection with mobile phones and portable electronic devices. It has been reported that every 3.5 seconds someone in America loses a cell phone. It has also been reported that Americans lost about $30 billion worth of mobile phones in 2011.

Mobile phones and portable electronic tablets are protected internally and externally through applications and phone/tablet case accessories, such as Otterbox, or GPS apps like Sygie or Mapquest, to find or help prevent people's valuable items from being lost, stolen, or broken. These applications and phone/tablet case accessories are proven to find lost/stolen items or prevent phones from breaking. The problem occurs is when the customer's phone has been turned off due to low battery charge or completely turned off manually. These applications and phone/tablet accessories do not function under these circumstances. As a result, the customer is unable to locate and retrieve their phone/tablet.

According there is a need for a case for mobile phones and portable electronic devices that allows the device to be located even when the device has been lost or stolen and the device has been powered down or turned off.

SUMMARY OF THE INVENTION

The present invention provides a solution to the foregoing problems by providing customers with an innovative phone and mobile tablet case technology. This technology offers customers a fast and effective way to find their phone or mobile tablet whether it be lost or stolen. The product combines an independent electronic location device with a combination lock built into a phone or mobile tablet case accessory. Whether the user owns a specific model phone or mobile tablet, the present invention provides a locked case for the user's device that contains or stores a geographic location device for use whenever the device is lost or stolen.

More specifically, the present invention provides a case for a portable electronic device that includes a substantially hollow housing formed of a first section and a second section. The first section is dimensioned and configured to tightly retain the portable electronic device. A hinged connector secures a first portion of the first section to a first portion of the second section and allows access to the portable electronic device when the second section is in an open position. One or more locking mechanisms removably connect a second portion of the first section to a second portion of the second section and prevents access to the portable electronic device when the second section is in a closed and locked position. A locating device is disposed within or attached to the first section.

BRIEF DESCRIPTION OF THE DRAWINGS

For a more complete understanding of the features and advantages of the present invention, reference is now made to the detailed description of the invention along with the accompanying figures and in which:

FIGS. 4A, 4B, 4C and 4D depict various views of a housing in accordance with one embodiment of the present invention;

FIGS. 8A and 8B depict various views of a case in accordance with another embodiment of the present invention;

DETAILED DESCRIPTION OF THE INVENTION

Figure 1A:
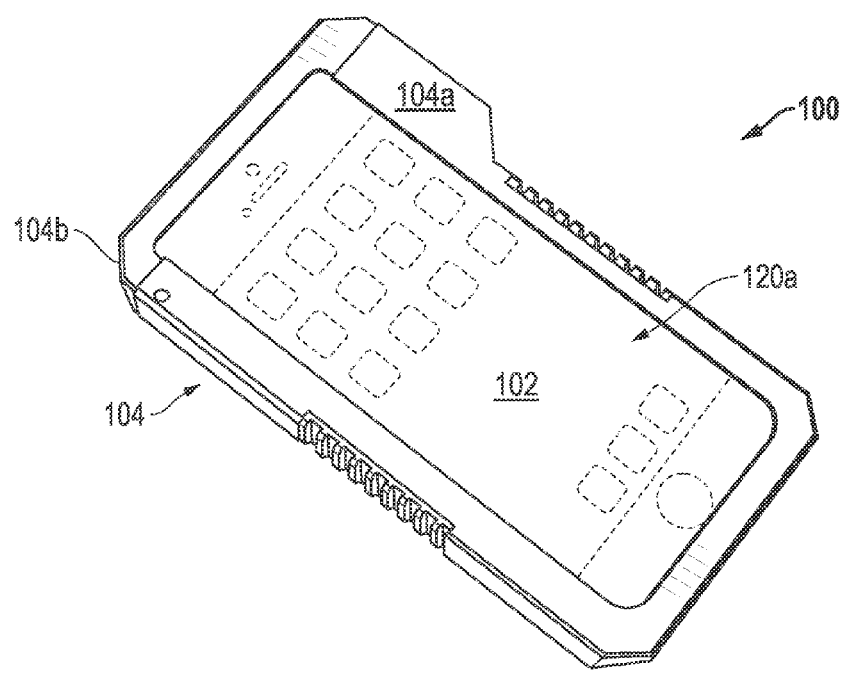
FIGS. 1A and 1B are images of a case in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Note that these terms may be used interchangeable without limiting the scope of the present invention. Terms such as "a", "an"

and "the" are not intended to refer to only a singular entity, but include the general class of which a specific example may be used for illustration. The terminology herein is used to describe specific embodiments of the invention, but their usage does not delimit the invention, except as outlined in the claims.

The present invention provides a solution to the foregoing problems by providing customers with an innovative phone and mobile tablet case technology. This technology offers customers a fast and effective way to find their phone or mobile tablet whether it be lost or stolen. The product combines an independent electronic location device with a combination lock built into a phone or mobile tablet case accessory. Whether the user owns a specific model phone or mobile tablet, the present invention provides a locked case for the user's device that contains or stores a geographic location device for use whenever the device is lost or stolen.

The case for a portable electronic device (e.g., a mobile phone, electronic tablet, portable computing device, portable entertainment device, etc.) includes a substantially hollow housing formed of a first section and a second section. The first section is dimensioned and configured to tightly retain the portable electronic device. A hinged connector secures a first portion of the first section to a first portion of the second section and allows access to the portable electronic device when the second section is in an open position. One or more locking mechanisms removably connect a second portion of the first section to a second portion of the second section and prevents access to the portable electronic device when the second section is in a closed and locked position. The one or more locking mechanisms can be a combination lock, keyed lock, lockable zipper, keypad lock, biometric lock (e.g., fingerprint, face recognition, DNA, palm print, iris recognition, retina, odor/scent, etc.), etc. The division between the first and second sections of the housing can be any desirable configuration that maintains the functionality of the case. The hinged connector and the one or more locking mechanisms can be placed anywhere between the first and second sections of the housing. A locating device is disposed within or attached to the first section. The locating device can be a passive or active radio identification (RFID) tag/device, a global navigation satellite system device (e.g., GPS, etc.), a wireless transceiver (e.g., WiFi, Bluetooth, Bluetooth Low Energy (BLE), etc.), etc. Some suppliers of such locating devices include, but are not limited to, Tile, Gecko and Button Trackr.

The first section of the housing may include a transparent screen protector or an opening proximate to a screen of the portable electronic device. The case may also include one or more opening proximate to one or more connectors, one or more controls or one or more cameras of the portable electronic device. In addition, the case may include a power source for the one or more locking mechanisms or the locating device (e.g., a battery, one or more solar cells, an electromagnetic harvesting device, etc.). A battery charger may also be integrated into the housing. The housing can be made of a rigid material, a semi-rigid material, a glow-in-the-dark material, etc. Moreover, the housing can be a waterproof housing, a shockproof housing, a dustproof housing, a crushproof housing or a combination thereof. The housing may also include one or more compartments attached to or integrated into the first section for money, cards, keys or a combination thereof.

Figure 1B:
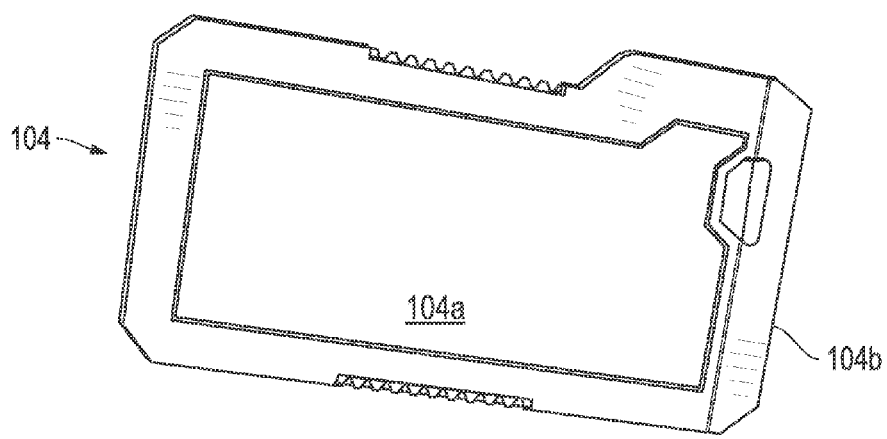
Figure 2:
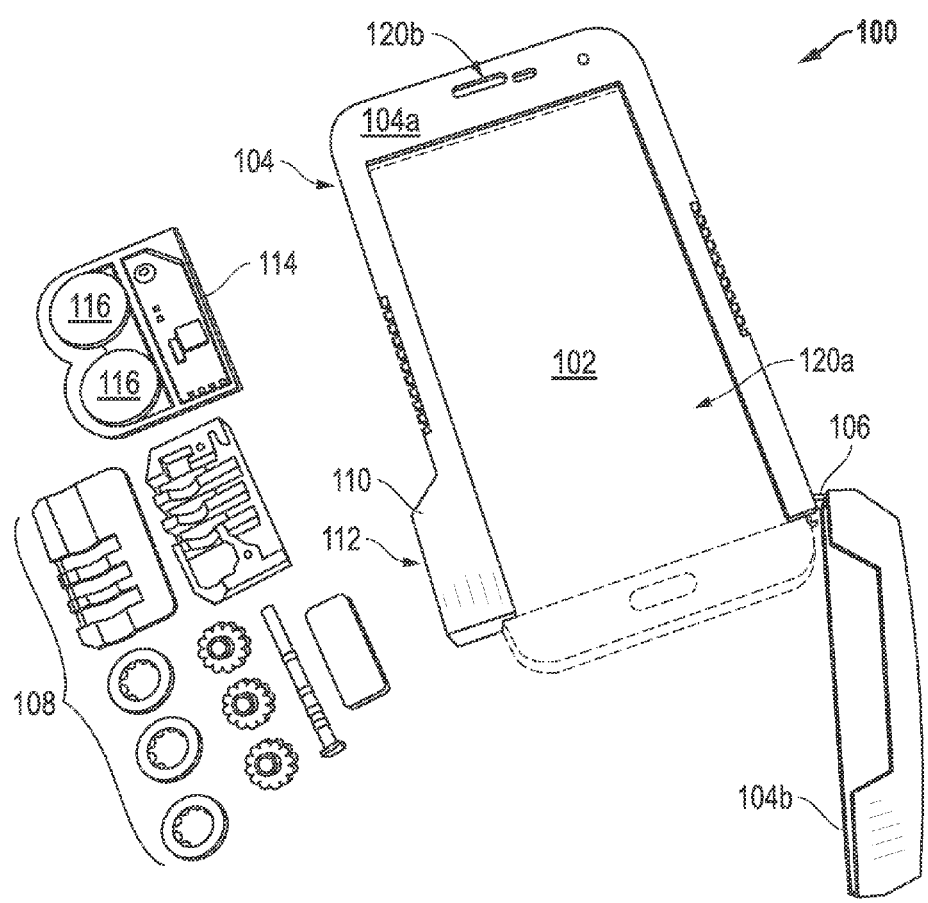
FIG. 2 is an image of a case in accordance with one embodiment of the present invention.
Figures 3A, 3B:
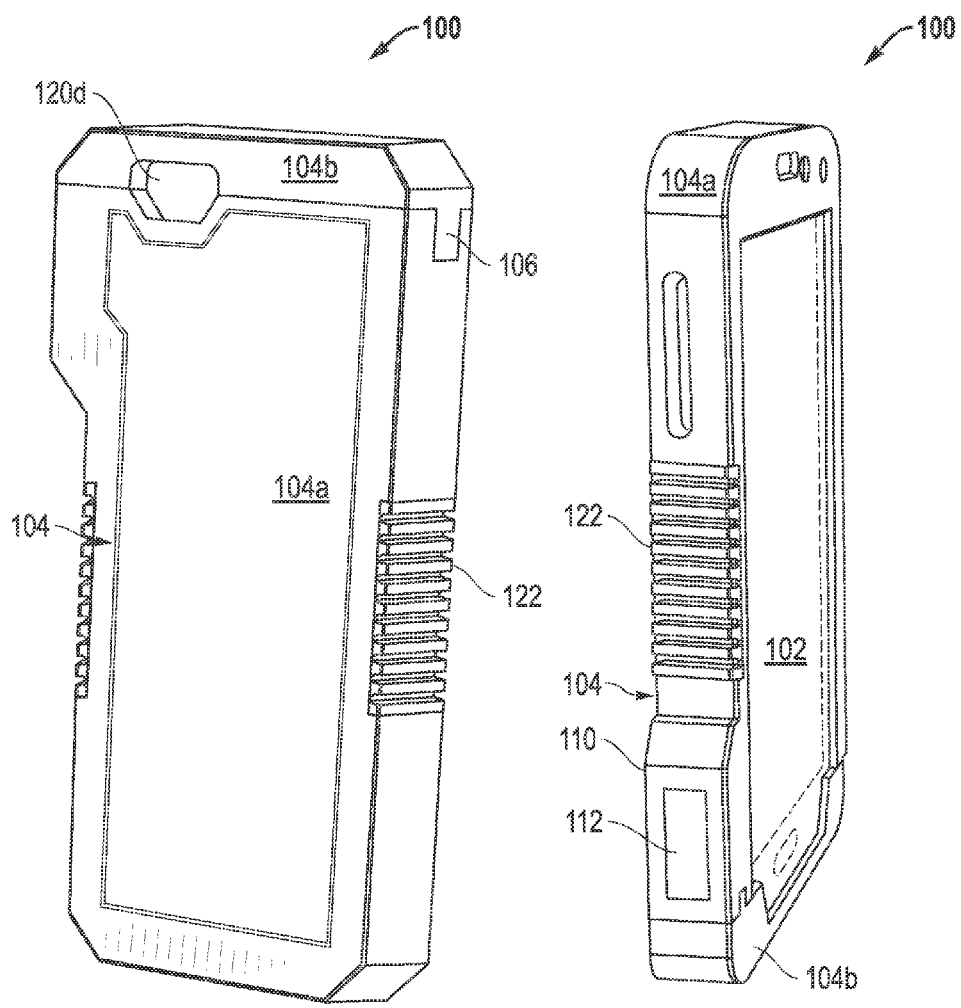
FIGS. 3A and 3B are images of a case in accordance with one embodiment of the present invention.

Now referring to FIGS. 1A-4D, various non-limiting views of an example of a case in accordance with the present invention will now be described. FIGS. 1A and 1B are images of a case 100 in accordance with one embodiment of the present invention. FIG. 2 is an image of a case 100 in accordance with one embodiment of the present invention. FIGS. 3A and 3B are images of a case 100 in accordance with one embodiment of the present invention. FIGS. 4A, 4B, 4C and 4D depict various views of a housing 104 in accordance with one embodiment of the present invention.

The case 100 for a portable electronic device 102 includes a substantially hollow housing 104 formed of a first section 104a and a second section 104b. As shown, the portable electronic device 102 is an iPhone, but the case 100 can be made to fit any brand or model of mobile phone, electronic tablet, portable computing device, portable entertainment device, etc. The first section 104a is dimensioned and configured to tightly retain the portable electronic device 102. A hinged connector 106 secures a first portion of the first section 104a to a first portion of the second section 104b and allows access to the portable electronic device 102 when the second section 104b is in an open position (see FIG. 2). One or more locking mechanisms 108 removably connect a second portion of the first section 104a to a second portion of the second section 104b and prevents access to the portable electronic device 100 when the second section 104b is in a closed and locked position (see FIGS. 1A-1B, 3A-3B). The one or more locking mechanisms 108 can be a combination lock, keyed lock, lockable zipper, keypad lock, biometric lock (e.g., fingerprint, face recognition, DNA, palm print, iris recognition, retina, odor/scent, etc.), etc. As shown, the locking mechanism 108 is a combination lock that fits within an enlarged portion 110 of the first section 104a and second section 104b, which is configured to accommodate the locking mechanism 108. As shown, the dials of the combination lock are accessible via a lock opening 112 in the first section 104a of the housing. The division between the first section 104a and second section 104b of the housing 104 can be any desirable configuration that maintains the functionality of the case. The hinged connector 106 and the one or more locking mechanisms 108 can be placed anywhere between the first section 104a and second section 104b of the housing 104. A locating device 114 is disposed within or attached to the first section 104a of the housing. The locating device 114 can be a passive or active radio identification (RFID) tag/device, a global navigation satellite system device (e.g., GPS, etc.), a wireless transceiver (e.g., WiFi, Bluetooth, Bluetooth Low Energy (BLE), etc.), etc. Some suppliers of such locating devices include, but are not limited to, Tile, Gecko and Button Trackr. As shown, the locating device 114 is an active device having its own power source (batteries 116) and fits within a recess 118 inside the first section 104a of the housing 104.

The case 100 includes various openings 120 proximate to the screen, connectors, controls, camera, microphone, speakers and vents of the portable electronic device 102. For example, the screen opening 120a can be large enough to provide access to the on/off/sleep/wake button, speaker and front camera (FIGS. 1A-1B, 4A-AC). Alternatively, separate speaker opening 120b and front camera opening 120c can be provided (FIGS. 2, 3A-3B). A rear camera opening 120d can be provided in the back of the housing 104. Power connector opening 120e, microphone openings 120f and earphone/microphone connector opening 120g can be provided in the bottom of the housing 104. A volume and ring/silent control opening 120h can be provided in a side of the housing 104. The various openings 120 can be arranged and configured to accommodate the specifications of any portable electronic device 102.

Although not shown in FIGS. 1A-4D, the first section 104a of the housing 104 may include a transparent screen protector. The case 100 may also include a power source for the one or more locking mechanisms 108 and/or the locating device 114 (e.g., a battery, one or more solar cells, an electromagnetic harvesting device, etc.). A battery charger may also be integrated into the housing 104. The housing 104 can be made of a rigid material, a semi-rigid material, a glow-in-the-dark material, etc. Moreover, the housing 104 can be a waterproof housing, a shockproof housing, a dustproof housing, a crushproof housing or a combination thereof. The exterior of the housing 104 may include grips or texturing 122 to improve handling and stability of the case 100. The housing 104 may also include one or more compartments attached to or integrated into the first section 104a for money, cards, keys or a combination thereof.

Figure 5A:
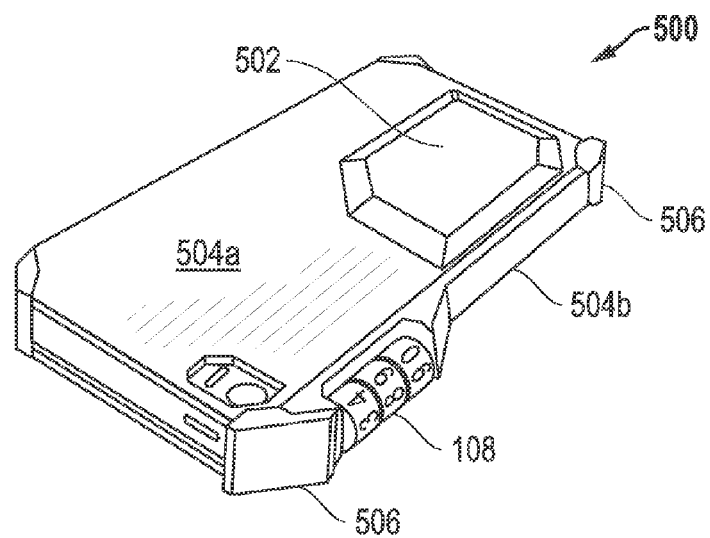
FIGS. 5A, 5B and 5C depict various views of a case in accordance with another embodiment of the present invention.
Figure 5B:
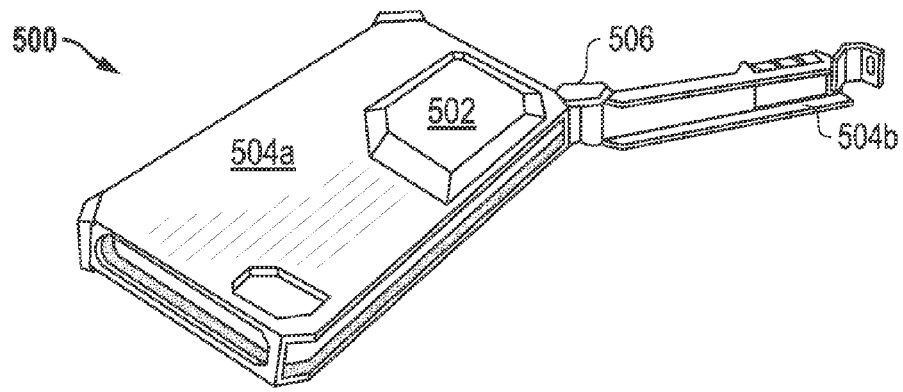
Figure 5C:
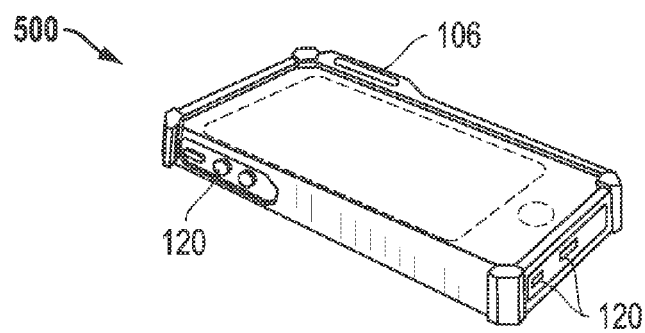

Referring now to FIGS. 5A, 5B and 5C, various views of a case 500 in accordance with another embodiment of the present invention are shown. Case 500 is similar to case 100 (FIGS. 1A-4D), except that: (a) the first section 104a and second section 104b of the housing 104 form a main portion 504a and a side portion 504b instead of a main portion 104a and a top portion 104b; (b) the combination lock 108 is part of the second section 104b instead of the first portion 104a; (c) the recess 118 for the locating device 114 forms a raised portion 502 on the back of the case 500; (d) bumpers 506 at the four corners of the case 500 hide the hinged connector 106 and lock; and (e) the openings 120 are configured and aligned differently.

Figure 6A:
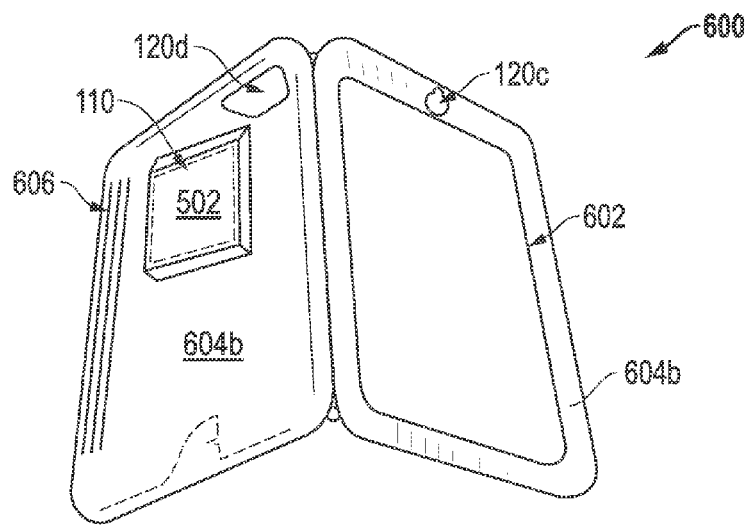
FIGS. 6A and 6B depict various views of a case in accordance with another embodiment of the present invention.

Now referring to FIGS. 6A (internal view) and 6B (external view), various views of a case 600 in accordance with another embodiment of the present invention are shown. Case 600 is similar to case 100 (FIGS. 1A-4D) and case 500 (FIGS. 5A-5C), except that: (a) the first section 104a and second section 104b of the housing 104 form a front portion 604a and a back portion 604b instead of a main portion 104a and a top portion 104b; (b) the combination lock 108 is part of the second section 104b instead of the first portion 104a; (c) the recess 118 for the locating device 114 forms a raised portion 502 on the back of the case 600; (d) the front portion 604a includes a screen protector 602; (e) the openings 120 are configured and aligned differently; and (f) three snap ridges 606 are provided for the portable device case structure.

Figure 6B:
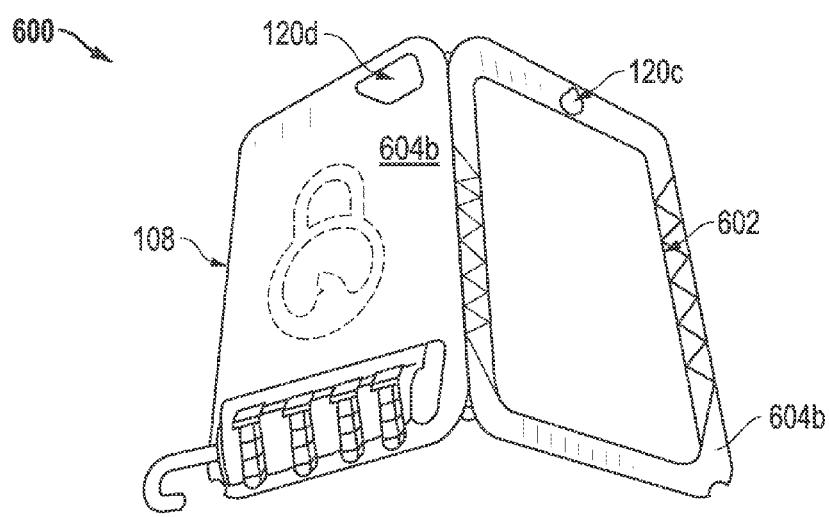
Figure 7A:
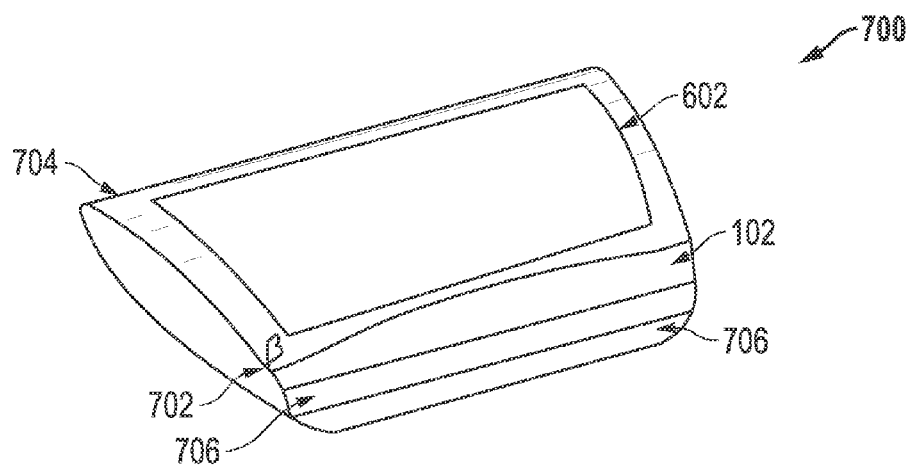
FIGS. 7A and 7B depict various views of a case in accordance with yet another embodiment of the present invention.

Referring now to FIGS. 7A (front view) and 7B (back view), various views of a case 700 in accordance with yet another embodiment of the present invention are shown. Case 700 can be made of canvas and includes compartments to store cash, change, cards, etc. Case 700 is similar to case 100 (FIGS. 1A-4D), case 500 (FIGS. 5A-5C) and case 600 (FIGS. 6A-6B), except that: (a) the first section 104a and second section 104b of the housing 104 form a single enclosure 704 with a zipper 702 opening for the portable device 102 instead of a main portion 104a and a top portion 104b; (b) the combination lock 108 is a zipper 702; (c) the single enclosure 704 includes a screen protector 602; and (d) openings 706 are provided for compartments to store cash, change, cards, etc.

Figure 7B:
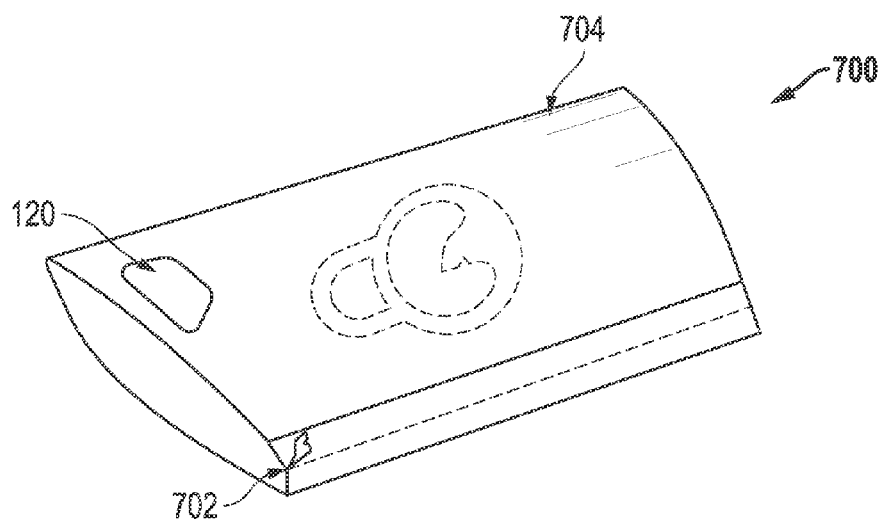
Figure 9A:
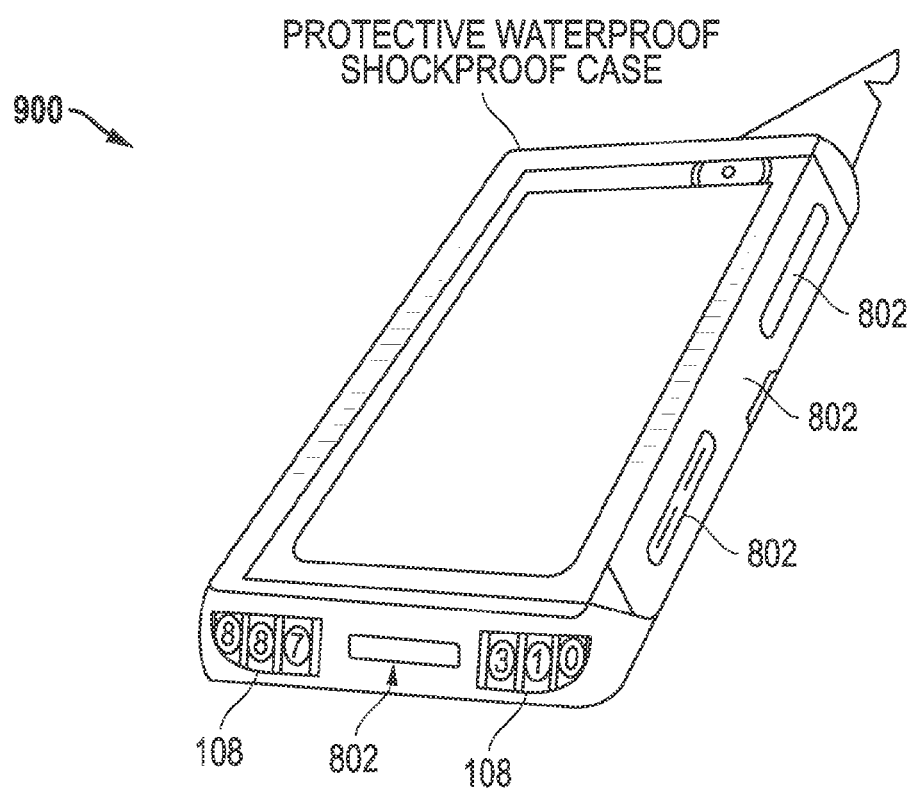
FIGS. 9A and 9B depict various views of a case in accordance with another embodiment of the present invention.
Figure 9B:
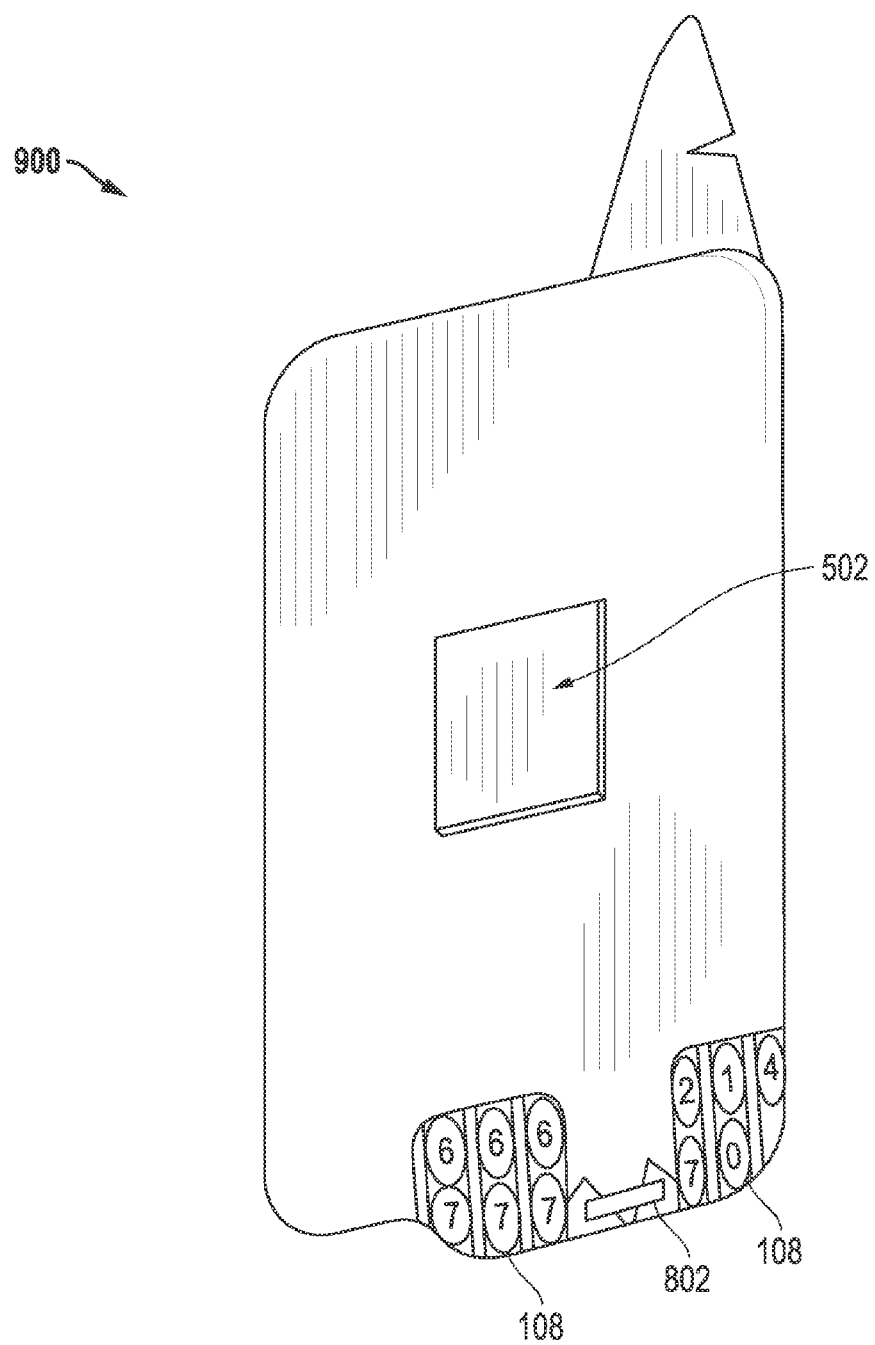

Now referring to FIGS. 8A (back view), 8B (front view), 9A (back view) and 9B (front view), various views of cases 800 and 900 in accordance with another embodiment of the present invention are shown. Cases 800 and 900 are similar to case 100 (FIGS. 1A-4D), case 500 (FIGS. 5A-5C), case 600 (FIGS. 6A-6B) and case 700 (FIGS. 7A-7B). Note that the combination lock 108 also includes a fastener 802, such as a snap, etc.

Figure 10A:
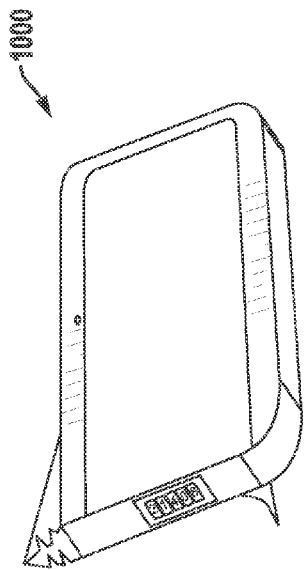
FIGS. 10A and 10B depict various views of a case for a tablet in accordance with another embodiment of the present invention.
Figure 10B:
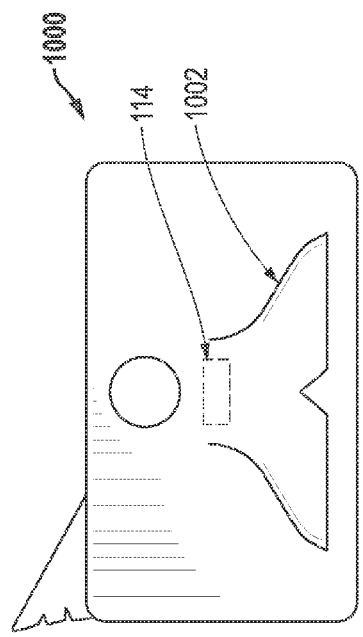

Referring now to FIGS. 10A (front view) and 10B (back view), various views of a case 1000 for a tablet in accordance with another embodiment of the present invention are shown. The case 1000 includes a stand 1002.

Figure 11A:
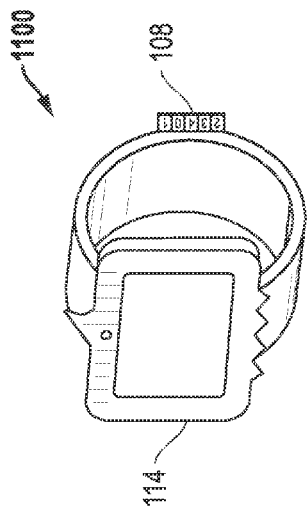
FIGS. 11A and 11B depict various views of a case for a smart watch in accordance with another embodiment of the present invention.
Figure 11B:
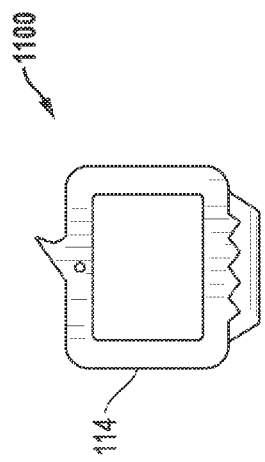

Now referring to FIGS. 11A (side view) and 11B (front view), various views of a case for a smart watch 1100 in accordance with another embodiment of the present invention are shown.

All of the foregoing embodiments may include lighting and charger/electronic hardware in the respective cases that following functionality:

1. Charges Phone/GPS Hardware
2. Protect your Internet and WIFI connection, and stopped being monitored by advertisers, search engines, hackers, etc.
3. LocShark privacy browser leaves nothing behind (i.e., no cache, cookies, or history, hide/mask IP address, encrypted internet connection, etc.).
4. Protect your location data backup your phones encrypted cloud storage and access your GPS locations through the app in complete privacy.
5. Case links with Bluetooth on smartphone and lights up case when notifications are received.

In other words, the case may include a software application loaded on the portable electronic device that: (a) protects communications with the portable electronic device; (b) prevents monitoring of the portable electronic device by unauthorized third party devices; (c) eliminates historical browsing data stored on the portable electronic device; (d) encrypts communications with the portable electronic device; (e) hides or masks an IP address of the portable electronic device; (f) protects location data backup of the portable electronic device and allows authorized remote access to a location of the portable electronic device; and/or (g) any other desirable functionality to protect the user or the portable electronic device. The case may also include a light disposed on the case that lights up whenever notifications are received by the portable electronic device.

An example of how the present invention can be used will now be described. You're at a party and you just bought a new iPhone 5s or 6 and Otterbox to go with it.

(1st Problem) You misplace your phone at the party and your phone is dead.

(2nd Problem) Someone finds your phone but doesn't return it.

(1st Solution) The present invention allows you to obtain your lost or stolen item. It also allows you to place any locating device (e.g., RFID tag) to your case.

(2nd Solution) The present invention allows you to have one or multiple combination lock/locks (#, colors, symbols, fingerprint, eye/face recognition, etc.) built-in with the case; anywhere on the case that the combination lock seems fit for the best function: back, side, bottom, top, or even front of case. This allows unwanted people who have your device not to take the case off (you are the only one who knows your combination).

This allows the present invention to have a built-in global positioning system (GPS) or RFID tag to track where your device is located by using a passive reader active tag (PRAT), active reader passive tag (APRT), active reader active tag (ARAT) using a mobile app or website.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A case for a portable electronic device having an outer cover comprising:
    a substantially hollow housing formed of a first section and a second section;
    the first section dimensioned and configured to tightly retain the outer cover of the portable electronic device;
    a hinged connector securing a first portion of the first section to a first portion of the second section that allows access to and removal of the portable electronic device when the second section is in an open position;
    one or more locking mechanisms removably connecting a second portion of the first section to a second portion of the second section that prevents access to and removal of the portable electronic device when the second section is in a closed and locked position;
    a geographic location device disposed within or attached to the first section that is not connected to the portable electronic device, operates independently of the portable electronic device and provides a location of the case even when the portable electronic device is turned off;
    a power source disposed within the case that is connected to the one or more locking mechanisms or the geographic location device, is not connected to the portable electronic device, and operates independently of the portable electronic device; and
    the case provides a second outer cover for the portable electronic device.

2. The case as recited in claim 1, the first section including a transparent screen protector proximate to a screen of the portable electronic device.

3. The case as recited in claim 1, the first section including an opening proximate to a screen of the portable electronic device.

4. The case as recited in claim 1, further comprising one or more openings proximate to one or more connectors, one or more controls or one or more cameras of the portable electronic device.

5. The case as recited in claim 1, the one or more locking mechanisms comprising a combination lock, a keyed lock, a lockable zipper, a keypad lock, a biometric lock or a combination thereof.

6. The case as recited in claim 1, the locating device comprising a passive or active radio identification device, a global navigation satellite system device, a wireless transceiver or a combination thereof.

7. The case as recited in claim 1, the power source comprising a battery, one or more solar cells, an electromagnetic harvesting device or a combination thereof.

8. The case as recited in claim 1, the housing comprising a glow-in-the-dark material.

9. The case as recited in claim 1, the housing comprising a waterproof housing, a shockproof housing, a dustproof housing, a crushproof housing or a combination thereof.

10. The case as recited in claim 1, further comprising a battery charger integrated into the housing.

11. The case as recited in claim 1, further comprising one or more compartments attached to or integrated into the first section for money, cards, keys or a combination thereof.

12. The case as recited in claim 1, further comprising the portable electronic device disposed within the case and the portable electronic device comprising a mobile phone, an electronic tablet, a portable computing device or a portable entertainment device.

13. The case as recited in claim 12, further comprising a software application loaded on the portable electronic device that protects communications with the portable electronic device.

14. The case as recited in claim 12, further comprising a software application loaded on the portable electronic device that prevents monitoring of the portable electronic device by unauthorized third party devices.

15. The case as recited in claim 12, further comprising a software application loaded on the portable electronic device that eliminates historical browsing data stored on the portable electronic device.

16. The case as recited in claim 12, further comprising a software application loaded on the portable electronic device that encrypts communications with the portable electronic device.

17. The case as recited in claim 12, further comprising a software application loaded on the portable electronic device that hides or masks an IP address of the portable electronic device.

18. The case as recited in claim 12, further comprising a software application loaded on the portable electronic device that protects location data backup of the portable electronic device and allows authorized remote access to a location of the portable electronic device.

19. The case as recited in claim 1, further comprising a light disposed on the case that lights up whenever notifications are received by the portable electronic device.

* * * * *